US009028602B2

(12) United States Patent
Chughtai et al.

(10) Patent No.: US 9,028,602 B2
(45) Date of Patent: May 12, 2015

(54) BITUMINOUS COMPOSITION

(75) Inventors: Majid Jamshed Chughtai, Chester (GB); Anindya Kumar Ghosal, Bangalore (IN); Michael David Lankshear, Amsterdam (NL); David Strickland, Manchester (GB)

(73) Assignee: Shell Oil Company, Houston, TX (US)

( * ) Notice: Subject to any disclaimer, the term of this patent is extended or adjusted under 35 U.S.C. 154(b) by 175 days.

(21) Appl. No.: 13/580,193

(22) PCT Filed: Feb. 23, 2011

(86) PCT No.: PCT/IN2011/000109
§ 371 (c)(1),
(2), (4) Date: Sep. 12, 2012

(87) PCT Pub. No.: WO2011/104726
PCT Pub. Date: Sep. 1, 2011

(65) Prior Publication Data
US 2013/0004662 A1 Jan. 3, 2013

(30) Foreign Application Priority Data
Feb. 23, 2010 (EP) .................................... 10154428

(51) Int. Cl.
C08L 95/00 (2006.01)
C04B 28/36 (2006.01)
E01C 7/26 (2006.01)
C08K 3/06 (2006.01)
C08K 5/09 (2006.01)
C04B 111/00 (2006.01)

(52) U.S. Cl.
CPC ................. C08L 95/00 (2013.01); C04B 28/36 (2013.01); C04B 2111/0075 (2013.01); E01C 7/267 (2013.01); C08K 3/06 (2013.01); C08K 5/09 (2013.01); C08L 2555/22 (2013.01); C08L 2555/54 (2013.01); C08L 2555/60 (2013.01)

(58) Field of Classification Search
CPC . C08L 95/00; C08L 2555/54; C08L 2555/60; C08K 3/06; C08K 5/09; E01C 7/267
USPC .................... 106/274, 275; 427/138
See application file for complete search history.

(56) References Cited

U.S. PATENT DOCUMENTS

| | | | | |
|---|---|---|---|---|
| 3,738,853 | A * | 6/1973 | Kopvillem et al. | 106/274 |
| 3,960,585 | A | 6/1976 | Gaw | 106/274 |
| 5,863,971 | A | 1/1999 | Baanders et al. | 524/68 |
| 6,863,724 | B2 * | 3/2005 | Bailey et al. | 106/274 |
| 7,824,485 | B2 * | 11/2010 | Buras et al. | 106/274 |
| 8,025,724 | B2 * | 9/2011 | Deme | 106/274 |
| 8,361,216 | B2 * | 1/2013 | Chughtai et al. | 106/274 |
| 8,557,034 | B2 * | 10/2013 | Colange et al. | 106/274 |
| 2010/0288165 | A1 * | 11/2010 | Deme | 106/274 |
| 2011/0041729 | A1 * | 2/2011 | Colange et al. | 427/138 |

FOREIGN PATENT DOCUMENTS

| | | | | |
|---|---|---|---|---|
| JP | 50135114 | 10/1975 | | |
| JP | 2004537665 | 12/2004 | | |
| WO | WO03014231 | 2/2003 | ............... | C09D 1/00 |
| WO | WO2005059016 | 6/2005 | ............... | C08K 3/00 |
| WO | WO 2009/121913 A1 * | 10/2009 | | |
| WO | WO2009121917 | 10/2009 | ............. | C04B 24/08 |

OTHER PUBLICATIONS

Shell; "Introduction to Shell Thiopave"; Internet Citation http://www-static.shell.com/static/sulphur/downloads/introduction_shell_thiopave.pdf; p. 1-9; May 2010.
Timm, D. et al.; "NCAT Report 09-05: Evaluation of Mixture Performance and Structural Capacity of Pavements Using Shell Thiopave"; National Center for Asphalt Technology Received from the Internet: http://www.ncat.s/reports/repo9-05.pdf; pp. 1-91; Aug. 2009.
Fitts, G.L.; "Sulphur's Place in CE"; Shell Thiopave Technologies for Sulphur Enhanced Road Construction; Internet Citation: http://www.foundationperformance.org/pastpresentations/fittspressslides-18Feb09.pdf; pp. 1-36; Feb. 18, 2009.
Hurley, GC.; et al; "Evaluation of Sasobit for Use in Warm Mix Asphalt"; Retrieved from Internet, http://www.eng.auburn.edu/center/nat/reports/rep05-06.pdf ; pp. 1-32; Jun. 2005.
Hurley, G.C. et al.; "NCAT Report 06-02: Evaluation of Evotherm for Use in Warm Mix Asphalt"; Retrieved from the Internet http://www.meadwestvaco.com/mwv/groups/content/documents/document/mwv003429.pdf; pp. 1-49; Jun. 2006.
Timm, D.H., et al; "Incorporation of Sulphur Extended Asphalt Mix in Perpetual Pavement Design"; International Conference on Perpetual Pavement; Retrieved from Internet: http://www.ktc.uky.edu/kytc/kypel/downloadAttachment.php?fileIndex=541>; pp. 1-18; Jul. 23, 2009.
Federal Highway Administration; "Warm Mix Asphalt Technologies and Research"; Retrieved from Internet: http://www.fhwa.dot.gov/pavement/asphalt/wma.cfm>; pp. 1-5; Oct. 29, 2008.
Nobel, A; "Rediset WMX: Improved Performance at Lower Temperature"; Internet Citation: http://www.surfactants.akzonobel.com/asphalt/pdf/rediset%2Brochure_0907.pdf; pp. 1-6; 2008.
Zydex Industries; "Paving the Way for Nanotechnology: Road to Progress"; Retrieved from Internet: http://www.zydexindustries.com/cms/downloadDoc.php?id=986; pp. 1-16; 2008.
Bin Xu et al., Study on the Reological Behavior of the Stearic Acid Modified Pthches, Coal Conversion, vol. 25, No. 4 pp. 82-86.
Xiwu, Y. et al.,"Investigation on the Properties of Sulphur Modified Asphalt Mixture and its Modifying Mechanism", Journal of Hunan University of Science & Technology (Natural Science Ed.), vol. 24, No. 3, (Sep. 2009), pp. 61-67.

\* cited by examiner

Primary Examiner — Helene Klemanski
(74) Attorney, Agent, or Firm — Charles W. Stewart

(57) ABSTRACT

The invention provides a bituminous composition comprising a bitumen in an amount ranging from 20 to 90% wt, a carboxylic additive in an amount of from 0.25 to 5% wt, and sulphur in an amount of 5 to 75% wt, all percentages based on the weight of bitumen, carboxylic additive and sulphur, wherein the carboxylic additive is selected from carboxylic acids, carboxylic esters and carboxylic anhydrides. It further provides a process for making this composition and asphalt compositions comprising such bituminous composition.

22 Claims, No Drawings

BITUMINOUS COMPOSITION

PRIORITY CLAIM

The present application claims priority from PCT/IN2011/000109, filed 23 Feb. 2011, which claims priority from European application 10154428.6, filed 23 Feb. 2010.

FIELD OF THE INVENTION

The present invention relates to a bituminous composition. The invention also relates to a process for manufacturing the bituminous composition; sulphur pellets; an asphalt composition comprising the bituminous composition, a process for manufacturing the asphalt composition; a process for preparing an asphalt pavement; and the asphalt pavement thus prepared.

BACKGROUND OF THE INVENTION

Bitumen is a material that is commonly used for the preparation of paving and roofing materials and for coatings such as for pipes and tank liners. In the road construction and road paving industry, it is a well-practised procedure to coat aggregate material such as sand, gravel, crushed stone or mixtures thereof with hot fluid bitumen, spread the coated material as a uniform layer on a road bed or previously built road while it is still hot, and compact the uniform layer by rolling with heavy rollers to form a smooth surfaced road.

The combination of bitumen with aggregate material, such as sand, gravel, crushed stone or mixtures thereof, is referred to as "asphalt". Bitumen, also referred to as "asphalt binder", is usually a liquid binder comprising asphaltenes, resins and oils. It may be naturally occurring, but may also be obtained from the residues of crude oils, e.g., by fractionation or by precipitation, e.g., by means of propane, or obtained after refining processes of crude oils, such as cracking. Bitumen usually contains hydrocarbons with a high asphaltene content, e.g., 12% wt or more. The bitumen may also have undergone some further treatment, e.g. blowing, whereby bitumen components are subjected to oxidation with oxygen, e.g. air, or a chemical component, e.g. phosphoric acid.

It is known in the art that sulphur can be mixed with bitumen for applications in the road construction and road paving industry. One of the problems encountered when using sulphur in bitumen is the unwanted formation of hydrogen sulphide, resulting from hydrogenation reactions of sulphur in bitumen at high temperatures, e.g. greater than 140° C.

In view of the substantial amounts of sulphur used, especially in asphalt having high sulphur-bitumen weight ratios, e.g. as high as 1:1, hydrogen sulphide emission is a serious nuisance. Therefore, it is desirable to reduce the unwanted formation and emission of hydrogen sulphide from sulphur-comprising asphalt.

One method to reduce hydrogen sulphide emission from hot cast sulphur-asphalt mixtures is described in WO2005/059016. Incorporating a hydrogen sulphide-suppressant such as ferric chloride into sulphur pellets can reduce hydrogen sulphide emissions during the manufacture of sulphur-containing asphalt. However, ferric sulphide can be difficult to handle and is liable to react with moisture in the air, so it desirable to find alternative means of reducing hydrogen sulphide emission from sulphur-asphalt mixtures.

U.S. Pat. No. 3,960,585 also discloses methods for reducing hydrogen sulphide emissions from hot cast sulphur-asphalt mixtures. In one example, a mixture of zinc oxide, stearic acid and diphenylguanidine (each present at 0.1 wt % based upon the weight of the mixture) is used as a suppressant. It is likely that the zinc oxide and stearic acid react to provide zinc stearate, which can function as a redox catalyst.

The inventors have now discovered that the temperature of manufacture of sulphur-containing asphalt can be lowered if an additional component is added during the manufacture of the asphalt. Lowering the temperature of mixing and/or the temperature of compaction reduces the amount of hydrogen sulphide that is released during the production of the asphalt pavement. Despite the lower mixing and/or compaction temperatures, the resulting asphalt is durable and has low water sensitivity.

SUMMARY OF THE INVENTION

Accordingly, the present invention provides a bituminous composition comprising a bitumen in an amount ranging from 20 to 90% wt, a carboxylic additive in an amount of from 0.25 to 5% wt, and sulphur in an amount of 5 to 75% wt, all percentages based on the weight of bitumen, carboxylic additive and sulphur, wherein the carboxylic additive is selected from carboxylic acids, carboxylic esters and carboxylic anhydrides.

The present invention also relates to a process for manufacturing the bituminous composition according to the present invention, the process comprising the steps of:
(i) heating bitumen;
(ii) mixing the hot bitumen so obtained with an amount of sulphur in the range of from 5 to 75 wt %, based on the weight of the bitumen, carboxylic additive and sulphur; wherein from 0.25% to 5% by weight of carboxylic additive based on the weight of bitumen, carboxylic additive and sulphur, is added in at least one of the steps (i) or (ii), wherein the carboxylic additive is selected from carboxylic acids, carboxylic esters and carboxylic anhydrides. The bituminous composition according to the present invention can advantageously be applied in road and roofing applications, preferably road applications.

The present invention further relates to an asphalt composition comprising an aggregate and the bituminous composition according to the present invention.

The present invention also provides a process for manufacturing the asphalt composition according to the present invention, the process comprising the steps of:
(i) heating bitumen;
(ii) heating aggregate;
(iii) mixing the hot bitumen with the hot aggregate in a mixing unit to form an asphalt composition; wherein from 5 to 75 wt % of sulphur, based on the weight of bitumen, carboxylic additive and sulphur, is added in at least one of steps (i), (ii) or (iii); and wherein from 0.25 to 5% wt of carboxylic additive, based on the weight of bitumen, carboxylic additive and sulphur, is added in at least one of the steps (i), (ii) or (iii).

The present invention in addition also provides a process for preparing an asphalt pavement, wherein an asphalt composition is prepared by means of the present asphalt composition manufacturing process, followed by the steps of:
(iv) spreading the asphalt composition into a layer; and
(v) compacting the layer.

The present invention further relates to an asphalt pavement prepared by means of such a process.

DETAILED DESCRIPTION OF THE INVENTION

The bituminous composition of the present invention comprises three essential components: bitumen, sulphur and carboxylic additive.

The bitumen can be selected from a wide range of bituminous, compounds. Whereas some documents in the prior art prescribe that the bitumen must have been subjected to blowing before it is to be used in paving applications, such requirement is not needed in the compositions according to the present invention. So, bitumen that can be employed may be straight run bitumen, thermally cracked residue or precipitation bitumen, e.g., from propane. Although not necessary, the bitumen may also have been subjected to blowing. The blowing may be carried out by treating the bitumen with an oxygen-containing gas, such as air, oxygen-enriched air, pure oxygen or any other gas that comprises molecular oxygen and an inert gas, such as carbon dioxide or nitrogen. The blowing operation may be conducted at temperatures of 175 to 400° C., preferably from 200 to 350° C. Alternatively, the blowing treatment may be conducted by means of a catalytic process. Suitable catalysts in such processes include ferric chloride, phosphoric acid, phosphorus pentoxide, aluminium chloride and boric acid. The use of phosphoric acid is preferred.

The bitumen content in the bitumen composition according to the invention may range from 20 to 90% wt, based on the weight of bitumen, sulphur and carboxylic additive. Good results have been obtained with amounts ranging from 50 to 75% wt.

The carboxylic additive is present in the bituminous composition at a level of from 0.25 to 5 wt %, more preferably at a level of from 0.5 to 3 wt %, most preferably from 1 to 3 wt %, by weight of the bitumen, sulphur and carboxylic additive.

The carboxylic additive is selected from carboxylic acids, carboxylic esters and carboxylic anhydrides. Preferably the carboxylic additive is a carboxylic acid.

In one preferred embodiment, the carboxylic additive is selected from carboxylic compounds of formula RCOOX wherein R is $C_8$-$C_{22}$ alkyl or alkenyl, and X is H; $C_1$-$C_{22}$ alkyl or alkenyl; or R'CO, wherein R' is $C_8$-$C_{22}$ alkyl or alkenyl. If X is the carboxylic additive is a carboxylic acid. X may be $C_1$-$C_{22}$ alkyl and the carboxylic additive is a carboxylic ester. X may be R'CO, wherein R' is $C_8$-$C_{22}$ alkyl or alkenyl, and the carboxylic additive is a carboxylic anhydride. Preferably R is an alkyl group. It is preferred that R is a $C_{15}$-$C_{20}$ alkyl or alkenyl group, more preferably a $C_{15}$-$C_{18}$ alkyl or alkenyl group, and especially a $C_{15}$-$C_{18}$ alkyl group. For example, the carboxylic additive may be stearic acid, ethyl stearate or stearic anhydride. Alternatively, R may be a $C_{21}$-$C_{22}$ alkyl group, e.g. the carboxylic additive may be behenic acid, ethyl behenate or behenic anhydride.

The carboxylic additive may also have more than one acid, ester or anhydride group. Trioctyl trimellitate and bis(2-ethyl hexyl) sebacate both have multiple ester groups and may be used as the carboxylic additive in the present invention.

Mixtures of one or more carboxylic additives may also be included in the compositions herein.

Sulphur constitutes an essential part of the binder material. Therefore, substantial amounts of sulphur are being used. That is different from the use of sulphur as cross-linking agent, where amounts below 2% wt, based on the weight of bitumen, sulphur and carboxylic additive, are employed. In the application of the current invention the sulphur is present in amounts ranging from 5 to 75% wt, based on the weight of bitumen, carboxylic additive and sulphur. Suitably, sulphur may be present in the bitumen composition in amounts ranging from 20 to 60% wt, since the strength enhancement that is being provided to the bitumen composition by the sulphur is reduced when less than 20% wt of sulphur is being used in the bitumen composition according to the invention.

As described in WO-A 03/014231 the sulphur may be added to the bitumen composition in the form of sulphur pellets, and preferably, the sulphur is incorporated into the compositions of the present invention in this form. Reference herein to pellets is to any type of sulphur material that has been cast from the molten state into some kind of regularly sized particle, for example flakes, slates or sphere-shaped sulphur such as prills, granules, nuggets and pastilles or half pea sized sulphur. The sulphur pellets typically comprise from 50 to 100 wt % of sulphur, based upon the weight of the sulphur pellets, preferably from 60 wt % and most preferably from 70 wt %; and typically to 99 wt %, and preferably to 95 wt % or to 100 wt %. A more preferred range is from 60 to 100 wt %.

These pellets may contain carbon black and, optionally, other ingredients, such as amyl acetate and wax. Carbon black may be present in amounts up to 5% wt, based on the pellet, preferably up to 2% wt. Suitably, the content of carbon black in the sulphur pellet is at least 0.25% wt. The content of other ingredients, such as amyl acetate and wax, typically does not exceed an amount of 1.0% wt each. When wax is present, it may be in the form of, for example, slack wax or wax derived from a Fischer-Tropsch process. Examples of suitable waxes for use herein are Sasobit®, a Fischer-Tropsch derived wax commercially available from Sasol, and SX100 wax, a Fischer-Tropsch wax from Shell Malaysia.

In one embodiment of the present invention, the carboxylic additive is present in the sulphur pellet.

Whereas the bituminous composition according to the invention comprises the three essential components, bitumen, carboxylic additive and sulphur, it is evident to the skilled person that to such a composition also different compounds may be added. For instance, polymers such as those mentioned in WO-A 03/014231 may be added.

The bituminous composition according to the present invention may also comprise an odour suppressant such as, for example, those disclosed in EP 2185640.

The bituminous and asphalt compositions of the present invention may also comprise wax, for example, slack wax or wax derived from a Fischer-Tropsch process. Examples of suitable waxes for use herein are Sasobit®, a Fischer-Tropsch derived wax commercially available from Sasol, and SX100 wax, a Fischer-Tropsch wax from Shell Malaysia.

The bituminous and asphalt compositions of the present invention may also comprise anti-stripping agents.

The bitumen composition according to the invention is advantageously used in the form of an asphalt composition comprising the bitumen composition and filler and/or aggregate. Examples of fillers have been described in U.S. Pat. No. 5,863,971, and include carbon black, silica, calcium carbonate, stabilisers, antioxidants, pigments and solvents. Examples of aggregates include sand, rock, gravel, stones, pebbles etc. These aggregate materials are particularly useful for paving roads.

Typically, the asphalt composition comprises at least 1 wt % of bitumen, based on the weight of the asphalt composition. An asphalt composition comprising from about 1 wt % to about 10 wt % of bitumen is preferred, with a special preference for asphalt compositions comprising from about 3 wt % to about 7 wt % of bitumen based on the weight of the asphalt composition.

The bitumen composition according to the present invention can be prepared by mixing the three ingredients in the appropriate amounts. It is preferred to prepare a bitumen-carboxylic additive mixture first and subsequently add sulphur.

Accordingly, the present invention provides a process for manufacturing the bituminous composition according to the present invention, the process comprising the steps of:

(i) heating bitumen;
(ii) mixing the hot bitumen so obtained with an amount of sulphur in the range of from 5 to 75 wt %, based on the weight of the bitumen, carboxylic additive and sulphur; wherein the carboxylic additive is added in at least one of the steps (i) or (ii).

The present invention also provides a process for manufacturing the asphalt composition according to the present invention, the process comprising the steps of:
(i) heating bitumen;
(ii) heating aggregate;
(iii) mixing the hot bitumen with the hot aggregate in a mixing unit to form an asphalt composition; wherein from 5 to 75 wt % of sulphur, based on the weight of bitumen, carboxylic additive and sulphur, is added in at least one of steps (i), (ii) or (iii); and wherein from 0.25 to 5% wt of carboxylic additive, based on the weight of bitumen, carboxylic additive and sulphur, is added in at least one of the steps (i), (ii) or (iii).

In step (i) of the processes for manufacturing the present bituminous or asphalt compositions the bitumen is heated, preferably at a temperature of from 60 to 200° C., preferably from 80 to 150° C., more preferably from 100 to 145° C., and even more preferably from 125 to 145° C. Working above 120° C. has the advantage that sulphur is liquid which facilitates the mixing process. Although the skilled person can easily determine the optimal mixing time the mixing time may be relatively short, e.g., from 10 to 600 seconds.

The bitumen is preferably a paving grade bitumen suitable for road application having a penetration of, for example, from 9 to 1000 dmm, more preferably of from 15 to 450 dmm (tested at 25° C. according to EN 1426: 1999) and a softening point of from 25 to 100° C., more preferably of from 25 to 60° C. (tested according to EN 1427: 1999).

In step (ii) of the process for manufacturing the present asphalt composition the aggregate is heated, preferably at a temperature of from 60 to 200° C., preferably from 80 to 170° C., more preferably from 100 to 160° C., even more preferably from 100 to 145° C. The aggregate is suitably any aggregate that is suitable for road applications. The aggregate may consist of a mixture of coarse aggregate (retained on a 4 mm sieve), fine aggregate (passes a 4 mm sieve but is retained on a 63 μm sieve) and filler (passes a 63 μm sieve).

In step (iii) of the asphalt manufacturing process, the hot bitumen and hot aggregate are mixed in a mixing unit. Suitably, the mixing takes place at a temperature of from 80 to 200° C., preferably from 90 to 150° C., more preferably from 100 to 145° C. Typically, the mixing time is from 10 to 60 seconds, preferably from 20 to 40 seconds.

The temperatures at which the bitumen and aggregate are heated and subsequently mixed are desirably kept as low as possible in order to reduce hydrogen sulphide emissions when the sulphur is added. However, the temperatures need to be sufficiently high such that the bitumen can effectively coat the aggregate. The present invention allows for bitumen, aggregate and sulphur mixes to be produced with suppression of odour emanating from the asphalt mixture.

In the process of manufacturing asphalt, sulphur is preferably added as late as possible in the process, preferably in step (iii).

In the processes of the present invention, it is preferable to add sulphur in the form of sulphur pellets, as described above.

The sulphur and the carboxylic additive may be added together, i.e. both in step (i), step (ii) or step (iii) of the respective processes for manufacturing the present bituminous and asphalt compositions. In a first embodiment, the hot aggregate is mixed with the sulphur and the carboxylic additive. Hot bitumen is then added to the hot aggregate-sulphur mixture. In a second embodiment, hot aggregate is mixed with hot bitumen, and the sulphur and the carboxylic additive are added to the hot bitumen-aggregate mixture. This embodiment offers the advantage of producing a stronger sulphur-asphalt mixture strength. In a third embodiment, hot bitumen is mixed with sulphur and the carboxylic additive and the resulting hot bitumen-sulphur mixture is mixed with hot aggregate to obtain a sulphur-comprising asphalt mixture.

Alternatively, in the asphalt manufacture process the carboxylic additive may be added separately. For example, the carboxylic additive may be added to the bitumen in step (i) and the sulphur may be added in step (iii).

In one embodiment of the invention, the sulphur and the carboxylic additive are added together; the sulphur is in the form of pellets and the carboxylic additive is incorporated in the sulphur pellets. The sulphur pellets preferably comprise from 0.1 to 28 wt % of the carboxylic additive, based upon the weight of the sulphur pellets. The sulphur pellets are suitably prepared by a process wherein liquid sulphur is mixed with the carboxylic additive and optionally additional components such as carbon black or amyl acetate. The mixture is then shaped and/or pelletised.

In one embodiment of the invention sulphur may be added in the form of two types of sulphur pellets; a first type of sulphur pellet that comprises the carboxylic additive and a second type of sulphur pellet that does not comprise the carboxylic additive. This has the advantage that the carboxylic additive is essentially concentrated in the first type of sulphur pellet and conventional sulphur pellets can be used to make up the rest of the sulphur requirement.

The invention further provides a process for preparing an asphalt pavement, wherein asphalt is prepared by a process according to the invention, and further comprising steps of:
(iv) spreading the asphalt into a layer; and
(v) compacting the layer.

The invention further provides an asphalt pavement prepared by the processes according to the invention.

The compaction in step (v) suitably takes place at a temperature of from 80 to 200° C., preferably from 90 to 150° C., more preferably from 100 to 145° C. The temperature of compaction is desirably kept as low as possible in order to reduce hydrogen sulphide emissions. However, the temperature of compaction needs to be sufficiently high such that the voids content of the resulting asphalt is sufficiently low for the asphalt to be durable and water resistant.

The invention will now be described by reference to examples which are illustrated by means of the following. Examples, which are not intended to limit the invention.

EXAMPLES

Bitumen samples were prepared by blending bitumen with sulphur pellets in the ratios specified in table 1, followed by addition of the carboxylic additive. The blending was carried out in the range 125-145° C. for 30 minutes.

Table 1 shows the formulation of each sample:

TABLE 1

|  | Bitumen | Sulphur | Carboxylic Additive |
|---|---|---|---|
| Comparative Example 1 | 100 wt % | 0 | 0 |
| Comparative Example 2 | 70 wt % | 30 wt % | 0 |
| Example 1 | 69.3 wt % | 29.7 wt % | 1.0 wt % stearic anhydride |

TABLE 1-continued

|  | Bitumen | Sulphur | Carboxylic Additive |
|---|---|---|---|
| Example 2 | 69.3 wt % | 29.7 wt % | 1.0 wt % ethyl stearate |
| Example 3 | 69.7 wt % | 29.9 wt % | 0.5 wt % ethyl stearate |
| Example 4 | 69.0 wt % | 26.6 wt % | 1.5 wt % stearic acid |
| Example 5 | 69.3 wt % | 29.7 wt % | 1.0 wt % trioctyl trimellitate |
| Example 6 | 69.3 wt % | 29.7 wt % | 1.0 wt % bis (2-ethyl hexyl) sebacate |

The viscosity was measured according to EN 13302 at 125, 135 and 145° C. using a Brookfield viscometer. The results are shown in Table 2:

TABLE 2

|  | Viscosity (Pa · s) | | |
|---|---|---|---|
|  | 125° C. | 135° C. | 145° C. |
| Comparative Example 1 | 1.05 | 0.85 | 0.51 |
| Comparative Example 2 | 0.83 | 0.47 | 0.30 |
| Example 1 | 0.59 | 0.33 | 0.23 |
| Example 2 | 0.56 | 0.35 | 0.20 |
| Example 3 | 0.69 | 0.40 | 0.25 |
| Example 4 | 0.70 | 0.42 | 0.26 |
| Example 5 | 0.71 | 0.43 | 0.27 |
| Example 6 | 0.77 | 0.46 | 0.28 |

The viscosity measurements are lower for the examples (each comprising a carboxylic additive) than for the comparative examples (which do not comprise a carboxylic additive). The temperature of manufacture of sulphur-containing asphalt needs to be sufficiently high to achieve an acceptably low viscosity. Therefore if a bitumen sample has a lower viscosity at a particular temperature, the temperature of manufacture of sulphur-containing asphalt can be lowered.

Asphalt samples were prepared using an AC-13 mixture design in accordance with the Chinese 'Technical Specifications for Construction of Highway Bitumen Pavements' (JTG F40-2004 and AASHTO T-245) Table 3 shows the formulation of each bitumen composition used to prepare the asphalt samples:

TABLE 3

|  | Bitumen | Sulphur | Carboxylic Additive |
|---|---|---|---|
| Comparative Example 3 | 70 wt % | 30 wt % | 0 |
| Comparative Example 4 | 60 wt % | 40 wt % | 0 |
| Example 7 | 69.3 wt % | 29.7 wt % | 1.0 wt % stearic acid |
| Example 8 | 59.4 wt % | 39.6 wt % | 1.0 wt % stearic acid |
| Example 9 | 69.3 wt % | 29.7 wt % | 1.0 wt % behenic acid |
| Example 10 | 59.4 wt % | 39.6 wt % | 1.0 wt % behenic acid |

The bitumen was a penetration grade bitumen having a penetration of 74 dmm and a softening point of 48.5° C. Sulphur was added in the form of sulphur pellets. The moisture stability was measured using retained Marshall stability and a freeze and thaw indirect tensile test according to standard Chinese test method T0729. The retained Marshall stability is the ratio of the Marshall stability of asphalt samples subjected to soaking compared to the Marshall stability of untreated samples. The tensile test results are reported as a tensile strength ratio which is the indirect tensile strength of a conditioned sample divided by indirect tensile strength of an unconditioned sample. The rutting resistance was measured by the standard Chinese wheel tracking test (T0719). In the test, a steel roller is used to compact a loose asphalt mix at compaction temperature in a 300 mm square and 50 mm deep mould. Next, the compacted specimen is set at 60° C. under 0.7 MPa repeated loading at 42 passes/min by a solid rubber tyre (200 mm diameter and 50 mm width). The dynamic stability (in pass/mm) is calculated from the formula below:

$$DS \text{ [passes/mm]} = N15'/(D60-D45)$$

wherein N15' is the loading passes (i.e. N15'=15 [min]×42 [passes/min]) and D60-D45 is the change in rut depth in the last 15 minutes of the test in mm. The moisture stability and rutting resistance results are shown in Table 4.

TABLE 4

|  | Retained Marshall stability (%) | Tensile strength ratio (%) | Dynamic stability (Pass/mm) |
|---|---|---|---|
| Comparative Example 3 | 61 | 50 | 1945 |
| Comparative Example 4 | 52 | 40 | 3724 |
| Example 7 | 77.9 | 72 | 1342 |
| Example 8 | 82 | 75 | 3147 |
| Example 9 | — | — | 2688 |
| Example 10 | — | 80 | 3643 |

The asphalt samples comprising stearic acid (examples 7 and 8) exhibit better moisture stability when compared to the asphalt samples according to the prior art (comparative examples 3 and 4). The asphalt samples comprising behenic acid (examples 9 and 10) exhibit better moisture stability and rutting resistance when compared to the asphalt samples according to the prior art (comparative examples 3 and 4).

What is claimed is:

1. A bituminous composition, comprising: a bitumen in an amount ranging from 20 to 90% wt, a carboxylic additive in an amount of from 0.25 to 5% wt, and sulphur in an amount of 5 to 75% wt, all percentages based on the weight of bitumen, carboxylic additive and sulphur, wherein the carboxylic additive is selected from the group consisting of carboxylic compounds of formula RCOOX wherein R is $C_8$-$C_{22}$ alkyl or alkenyl; and X is H, $C_1$-$C_{22}$ alkyl, $C_{1-22}$ alkenyl or R'CO, wherein R' is $C_8$-$C_{22}$ alkyl or alkenyl.

2. A composition according to claim 1, wherein X is H and R is a $C_{15}$-$C_{18}$ alkyl or alkenyl group.

3. A composition according to claim 1, wherein the sulphur is present in an amount ranging from 20 to 60% wt.

4. A process for manufacturing the bituminous composition according to claim 1, the process comprising the steps of:
   (i) heating bitumen;
   (ii) mixing the hot bitumen so obtained with an amount of sulphur in the range of from 5 to 75 wt %, based on the weight of the bitumen, carboxylic additive and sulphur;
   wherein from 0.25% to 5% by weight of carboxylic additive based on the weight of bitumen, carboxylic additive and sulphur, is added in at least one of the steps (i) or (ii), wherein the carboxylic additive is selected from the group consisting of carboxylic compounds of formula RCOOX wherein R is $C_8$-$C_{22}$ alkyl or alkenyl; and X is H, $C_1$-$C_{22}$ alkyl, $C_{1-22}$ alkenyl or R'CO, wherein R' is $C_8$-$C_{22}$ alkyl or alkenyl.

5. An asphalt composition comprising the bitumen composition according to claim 1 and filler and/or aggregate.

6. A process for manufacturing the asphalt composition according to claim 5, the process comprising the steps of:
   (i) heating bitumen;
   (ii) heating aggregate;
   (iii) mixing the hot bitumen with the hot aggregate in a mixing unit to form an asphalt composition; wherein from 5 to 75 wt % of sulphur, based on the weight of bitumen, carboxylic additive and sulphur, is added in at least one of steps (i), (ii) or (iii); and wherein from 0.25 to 5% wt of carboxylic additive, based on the weight of bitumen, carboxylic additive and sulphur, is added in at least one of the steps (i), (ii) or (iii).

7. Process A process according to claim 6 wherein the sulphur is added in the form of sulphur pellets.

8. A process for preparing an asphalt pavement, wherein an asphalt composition is prepared according to the process of claim 6 or claim 7, followed by the steps of:
(iv) spreading the asphalt composition into a layer; and
(v) compacting the layer.

9. A composition according to claim 1, wherein the bitumen is present in the bituminous composition in an amount in the range of from 50 to 75% wt.

10. A composition according to claim 9, wherein the sulphur is present in the bituminous composition in an amount in the range of from 20 to 60% wt.

11. A composition according to claim 10, wherein the carboxylic additive is present in the bituminous composition in an amount in the range of from 0.5 to 3% wt.

12. A composition according to claim 1, wherein the carboxylic additive is selected from the group consisting of stearic acid, ethyl stearate and stearic anhydride.

13. A composition according to claim 12, wherein the bitumen is present in the bituminous composition in an amount in the range of from 50 to 75% wt.

14. A composition according to claim 13, wherein the sulphur is present in the bituminous composition in an amount in the range of from 20 to 60% wt.

15. A composition according to claim 14, wherein the carboxylic additive is present in the bituminous composition in an amount in the range of from 1 to 3% wt.

16. A process according to claim 4, wherein the carboxylic additive is selected from the group consisting of stearic acid, ethyl stearate and stearic anhydride.

17. A process according to claim 16, wherein the bitumen is present in the bituminous composition in an amount in the range of from 50 to 75% wt.

18. A process according to claim 17, wherein the sulphur is present in the bituminous composition in an amount in the range of from 20 to 60% wt.

19. A process according to claim 18, wherein the carboxylic additive is present in the bituminous composition in an amount in the range of from 1 to 3% wt.

20. A process according to claim 6, wherein the bitumen is present in the bituminous composition in an amount in the range of from 50 to 75% wt.

21. A process according to claim 20, wherein the sulphur is present in the bituminous composition in an amount in the range of from 20 to 60% wt.

22. A process according to claim 21, wherein the carboxylic additive is present in the bituminous composition in an amount in the range of from 1 to 3% wt.

* * * * *